United States Patent Office 2,925,554
Patented Feb. 16, 1960

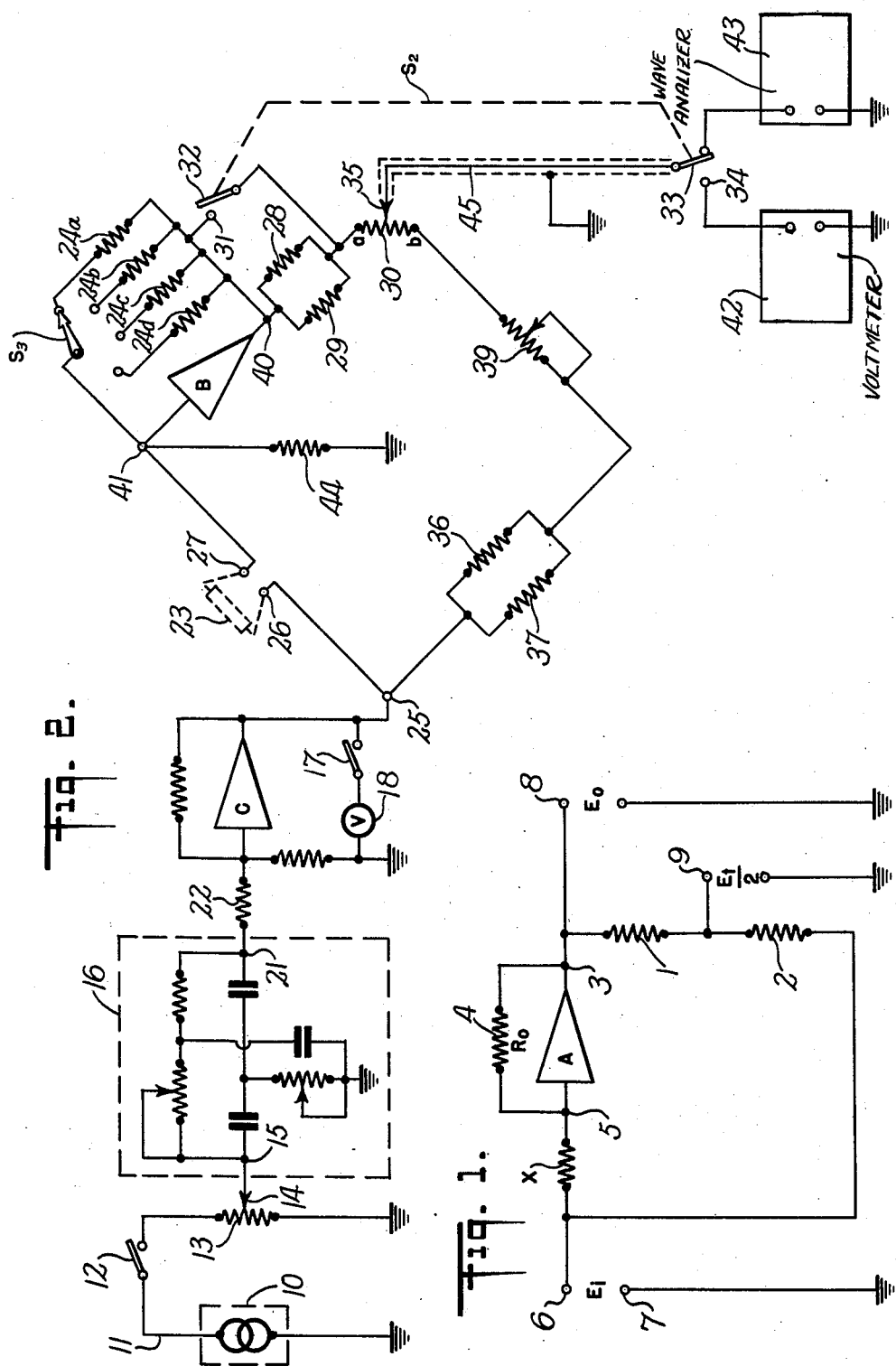

2,925,554

RESISTANCE CHECKER

Monson H. Hayes, Menlo Park, Calif., assignor to Link Aviation, Inc., Binghamton, N.Y., a corporation of New York Application March 11, 1954, Serial No. 415,501

3 Claims. (Cl. 324—57)

This invention relates to an improved method and means for testing and measuring the phase shift and voltage coefficient characteristics of electrical impedances, and particularly of electrical resistors.

In the electrical arts, generally, and particularly in the analogue computer, automatic control and instrumentation arts, both the phase shift and the voltage coefficient of resistance occurring in impedances and resistors utilized therein are characteristics which greatly affect operation of circuits, and a knowledge of these characteristics of impedances and resistors is necessary for proper circuit design. It is well known that in the manufacture of resistors, it is practically impossible to completely eliminate inductive or capacitative reactance so as to produce a resistor of pure resistance characteristics. Even high quality resistors, such as must be utilized in electrical analogue computers, inherently possess a small amount of reactance.

Whereas it has long been known that most resistance elements, in common with practically all electrically conductive materials, change their resistance values with changes in temperature, the voltage coefficient of resistance is a factor separate and distinct from the characteristic of temperature coefficient, and is believed to be wholly independent of the current flow through the resistance. The voltage coefficient relates to the percentage change in resistance value per unit change in voltage with applied voltage, as distinguished from any effects caused by heating by the applied voltage. It arises from a change in the conductive properties of the resistance material as the applied voltage is varied. In high quality resistors of 1,000 ohms or more, as must be employed in precision electronic circuits where the voltage coefficient should be very low, the factor of voltage coefficient may be determined as follows:

(1) $\quad \text{Voltage coefficient (percent/volt)} = 100 \frac{(R_1 - R_2)}{R_2} \times \frac{1}{E_1 - E_2}$ where $E_1$=a first continuous applied voltage, $E_2$=a second continuous applied voltage, $R_1$=resistance at voltage $E_1$, and $R_2$=resistance at voltage $E_2$.

For resistors rated at ¼ and ½ watt, as employed in computing, automatic control and similar circuits, the voltage coefficient should not exceed 0.035% per volt, in most applications, and for higher wattage resistors it should not exceed 0.02% per volt. For very accurate potential summing circuits, as employed in analog computers, the voltage coefficient should preferably be even lower than these values. The voltage coefficient factor is most pronounced in carbon type resistors, which have a negative voltage coefficient, i.e., their instantaneous resistance value decreases with the instantaneous value of an increasing potential.

Although complicated laboratory test procedures may be devised for measuring the factors of voltage coefficient, or of phase shift, in resistance elements, such laboratory techniques are not readily adaptable to production testing of manufactured resistors where it is necessary to test a large number of resistors in a minimum of time, and where the services of a skilled laboratory technician may not be available or economically feasible. Heretofore, manufacturers or users of large quantities of resistors have had no suitable means for rapidly and economically determining these characteristics of resistors to the degree of accuracy now required by advancements in the precision electronics industry.

One of the objects of the invention is to provide an improved method and means for testing impedance elements and for determining the phase shift characteristics thereof.

Another object of the invention is to provide an improved method and means for determining the voltage coefficient of impedances.

A further object of the invention is to provide in a unitary testing device means for determining either phase shift or voltage coefficient characteristics of impedances under test.

An additional object of the invention is to attain all of the above objects more efficiently and more economically in a reliable manner by means adapted for rapid production testing of impedance elements.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawing, in which:

Fig. 1 represents a simplified schematic diagram of a comparing network useful in the derivation of a mathematical expression for the factor of voltage coefficient, and;

Fig. 2 is a schematic diagram of my invention in which portions thereof are represented in block diagram for the sake of clarity.

In the following description I shall first explain the invention as adapted to the measurement of voltage coefficient, and then as the description proceeds I shall explain the manner in which the invention may also be used to measure phase shift in impedances under test.

Voltage coefficient measurement

To ascertain the characteristic of voltage coefficient, which may be of the order of .02% or less and hence very difficult to determine by known comparing network measurements, I have discovered that if a substantially pure sine-wave form of alternating potential is applied across a sample test resistor in a comparing network, the voltage wave form of current flowing through the resistor when the network is balanced will contain a third harmonic component which bears a definite relation to the voltage coefficient characteristic of the resistor. By detecting the third harmonic voltage produced by the sample resistor under test, and by displaying this detected voltage on a calibrated indicator, the factor of voltage coefficient of the sample resistor may be readily determined.

The magnitude of third harmonic voltage caused by the presence of the sample resistor in the balanced comparing network may be calculated from the relationship:

(2) $\quad e_3 = \left(1 + \frac{R_1}{R_2}\right) E_3$ where $R_2$ is the resistance of a standard wire wound resistor (24 in Fig. 2); $R_1$ is the resistance of the test sample (23 in Fig. 2), and $E_3$ is the value of third harmonic voltage observed on the indicator (43 in Fig. 2).

The voltage coefficient of the sample resistor under test may be calculated from the relationship:

$$(3) \qquad K = \frac{8.3 e_3}{E^2}$$

where E is the value of the pure sine-wave voltage applied across the sample resistor under test and $e_3$ is the value of the total third harmonic produced by the test resistor.

Referring now to Fig. 1 of the drawing, the derivation of the expression for voltage coefficient, (3) above, will be given. In the simplified comparing network of Fig. 1, a test resistor X of unknown voltage coefficient characteristics is connected in series with a summing amplifier A and output load resistors 1 and 2. The output terminal 3 of amplifier A is connected through a wire wound standard feedback resistor 4 to the amplifier input terminal 5. The input voltage $E_i$ is applied between terminal 6 and terminal 7 which is connected to ground. The amplifier output voltage $E_o$ appears between point 8 and ground. If resistors 1, 2 and 4 all have the same value, $R_o$, the voltage appearing across resistor 2, between point 9 and ground, will be one half the value of $E_t$, where $E_t$ represents the component of $E_o$ that is produced by the non-linear resistance of the test sample X.

In any conventional feedback summing amplifier the output potential equals the inverse of the input potential multiplied by the ratio of the feedback impedance to the input circuit summing impedance. Actually the output potential is also modified in accordance with amplifier loop gain A by a factor of $$\frac{A}{A+1}$$

Since amplifier loop gain usually is much greater than one, the factor $$\frac{A}{A+1}$$

may be considered as 1. Summing amplifiers of the type utilized are well-known to those skilled in the art and have been in wide use throughout the electrical industries for many years. The operation of such an amplifier is shown and described in detail in Patent 2,401,779 granted June 11, 1946, to Karl D. Swartzel. In relation to amplifier A of Fig. 1, the output potential $E_o$ may be expressed as:

$$(4) \qquad E_o = -E_i \frac{R_o}{X}$$

Otherwise explained, it may be seen that a current will be amplified in amplifier A whenever a potential exists at terminal 5. The phase inversion in amplifier A makes the output potential at terminal 3 opposite in polarity to the input potential to the amplifier. If terminal 5 is temporarily assumed to lie at ground potential, it will be seen that currents of opposite polarity will flow to terminal 5 through resistance X and resistance $R_o$. If, and only if, these two currents are equal in magnitude, the resultant potential at terminal 5 will be "zero" or ground, and there will be no potential input to the amplifier. Thus it will be seen that the summing amplifier A will always provide a current through its feedback impedance $R_o$ sufficient to cancel exactly the current being supplied through its input summing resistor X, so that terminal 5 will always lie at ground potential.

Assuming that resistances $R_o$ and $R_x$ are exactly equal, it will be seen, in order for the potential at terminal 5 to lie at ground, that potentials equal in magnitude and opposite in polarity must exist at terminals 6 and 3. Thus with an input potential $E_i$ at terminal 6, the potential at terminal 3 will be $-E_i$. As shown in Fig. 1, the potential $E_i$ is also connected to the lower terminal of resistance 2. Since resistances 1 and 2 are equal in impedance, the application of potentials equal in magnitude but opposite in polarity to their separate terminals will cause a zero potential or virtual ground to appear at their junction point, terminal 9. The above discussion assumes test resistance X is always exactly equal to feedback impedance $R_o$. If resistance X has a voltage coefficient, its resistance will change with applied voltage as explained above. The instantaneous resistance of test resistor X may be expressed as:

$$R_i = R_x[1 + k|E \sin \omega t|] \qquad (5)$$

Where $R_x$ equals the resistance of X with no voltage applied,
$k$ equals the voltage coefficient of the resistor X, and
$E$ equals the maximum or peak value of the potential $E_i$ applied to resistor X.

Substituting the actual instantaneous value of Expression 5 for the resistance of X into Expression 4, the output potential at terminal 3 may be seen to be:

$$E_o = -E \sin \omega t \left( \frac{R_o}{R_x[1 + k|E \sin \omega t|]} \right) \qquad (6)$$

If $R_o$ is selected so as to equal $R_x$, Expression 6 reduces to:

$$E_o = \frac{-E \sin \omega t}{1 + k|E \sin \omega t|} \qquad (7)$$

Since the potential at terminal 6 is $E_i = E \sin \omega t$ and since the potential at terminal 3 is the quantity given in Expression 7, the potential $E_{t/2}$ at terminal 9 between equal resistances 1 and 2 will equal the average between the two potentials, or:

$$\frac{E_t}{2} = \frac{E \sin \omega t - \dfrac{E \sin \omega t}{1 + k|E \sin \omega t|}}{2}$$

By the law of superposition, the potential $E_t$ at terminal 3 may be seen to be twice that $$\frac{E_t}{2}$$

at terminal 9, resistors 1 and 2 being equal, so that:

$$E_t = E \sin \omega t - \frac{E \sin \omega t}{1 + k|E \sin \omega t|}$$

Multiplying through by $1 + k|E \sin \omega t|$, we obtain:

$$E_t = \frac{E \sin \omega t + kE \sin \omega t|E \sin \omega t| - E \sin \omega t}{1 + k|E \sin \omega t|}$$

Combining terms in the numerator:

$$E_t = \frac{kE \sin \omega t |E \sin \omega t|}{1 + k|E \sin \omega t|}$$

Multiplying through in the numerator, and dropping the minute second order term $kE|\sin \omega t|$ in the denominator because $k$ is always small, we obtain:

$$E_t = kE^2 \sin \omega t |\sin \omega t| \qquad (8)$$

Fourier analysis of the function of Expression 8 reveals that, since the value of the function changes in one half cycle to an equal value of opposite sign.

$$f\left(t + \frac{T}{2}\right) = -f(t)$$

The function is symmetrical about the time axis, so that no even harmonics are present in the function. Analysis also reveals that the value of the function at time $-t$ is the opposite polarity value at time $t$, or that $$f(-t) = f(t),$$

indicating that the function is symmetrical about the $t = 0$ axis and no cosine terms are present in the function of Expression 8.

Fourier expansion of Expression 8, omitting cosine terms and even harmonics, is then made, letting $n\theta$ equal $\omega t$ to obtain:

$$E_n = \frac{1}{\pi}\left[\int_{-\pi}^{0} -KE^2 \sin^2\theta \sin n\theta d\theta + \int_{0}^{\pi} KE^2 \sin^2\theta \sin n\theta d\theta\right]$$

Substitute $$\frac{1-\cos^2\theta}{2} \text{ for } \sin^2\theta$$

$$E_n = \frac{kE^2}{2\pi}\left[\int_{-\pi}^{0} -(1-\cos^2\theta)\sin n\theta d\theta + \int_{0}^{\pi}(1-\cos^2\theta)\sin n\theta d\theta\right]$$

Integrating the above equation yields an expression for the total harmonic potential $E_n$ as follows:

$$E_n = \frac{8kE^2}{\pi} \cdot \frac{1}{n(n^2-4)}$$

Since the third harmonic is the largest measurable harmonic potential, $n=3$ may be substituted in the above expression, yielding an expression for the third harmonic potential $E_3$ at terminals 3 and 8:

(9) $$E_3 = \frac{8E^2k}{15\pi}$$

As mentioned above, the third harmonic potential at terminal 9 is one-half as great as the potential at terminal 3, so that:

$$E_9 = \frac{4E^2k}{15\pi}$$

Converting the voltages to R.M.S. or effective values by modification by $\sqrt{2}$, it may be seen that $$\frac{E_t}{2} \text{ (effective)}$$

or $E_9$ at terminal 9 may be expressed as:

$$2E_9 = \frac{8E^2k}{15\pi} \text{ (effective or R.M.S. voltages)}$$

Hence,

(10) $$k = \frac{8.3 E_9}{E^2} \text{ (effective or R.M.S. voltages)}$$

Referring now to Fig. 2 of the drawing, there is shown a power source of alternating current indicated generally at 10, which may be any suitable source of alternating current. Commercially available A.C. power may be employed for source 10. One terminal of power source 10 is connected to ground, and the other terminal is connected by conductor 11, through switch 12 to one side of potentiometer 13. The other side of potentiometer 13 is connected to ground. The wiper arm 14 of potentiometer 13 is connected to the input terminal 15 of a twin T filter network indicated generally at 16. The purpose of the twin T network 16 is to eliminate any odd harmonics present in the A.C. power supplied by source 10, and particularly to eliminate third harmonic frequency components from the voltage supplied to the comparing network from the source 10. Voltage from the output terminal 21 of filter network 16 is fed through resistor 22 into an isolating device C which I have indicated as comprising a negative feed-back amplifier. While I have shown a feed-back amplifier at C in Fig. 2, it is to be understood that other types of isolating devices may be employed in this portion of my circuit. For example, a cathode follower may be employed as the isolating device C.

The output voltage from isolating device C is connected to terminal 25 of the comparing network in Fig. 2. Also connected to terminal 25 is one terminal 26 of the pair of terminals 26—27 to which an unknown impedance or resistor may be connected, as represented by dotted lines at 23. Terminal 27 is connected to the input terminal 41 of an inversion isolating device, which may be a conventional feedback summing amplifier indicated schematically by the triangle B. Input terminal 41 also is connected to one side of amplifier B grid circuit input summing resistor 44, the other side of which is grounded. The output terminal 40 of feed-back amplifier B is connected through parallel fixed resistors 28 and 29 to the upper end $a$ of variable potential divider 30, to complete one path of a comparing network which extends from terminal 25 to adjustable contactor 35 of potential divider 30. The other path of this comparing network is formed by parallel resistors 36 and 37 in series with variable resistor 39 and the lower portion $b$ of variable potential divider 30.

It will be apparent in the comparing network of Fig. 2 that if the potential drop occurring along the two parallel paths may be made equal, the comparing network may be adjusted to balance, and a minimum output voltage with respect to ground will appear at the movable contactor 35 of variable potential divider 30. The amplitude of any voltage appearing at 35 may be measured by a vacuum tube voltmeter 42, and the frequency characteristics, as well as amplitude, may be determined by a wave analyzer 43. In order that the operation of this comparing network may be better understood, let it be assumed that an alternating voltage of positive instantaneous polarity appears at terminal 25. At that same instant this voltage will appear at the output terminal 40 of feed-back amplifier B as an alternating voltage of negative instantaneous polarity, due to the 180° phase reversal occurring in amplifier B. Thus, it will be understood that somewhere in the circuit between the positive potential at terminal 25 and the negative potential at 40, a point exists where theoretically no voltage exists. By suitable adjustment of potentiometer 30 and vernier rheostat 39, the movable contactor 35 of potentiometer 30 may be positioned to contact this balance point.

When the circuit of Fig. 2 is to be employed for measuring the voltage coefficient of test impedances, as for example carbon type resistors, the selected standard resistor 24, which is the feed-back coupling resistor for amplifier B, and the remaining resistors 28, 29, 36, 37 and 41 of the comparing network should be selected of wire wound types having very low or negligible voltage coefficients. Thus, as the input voltage supplied to the comparing network at juncture 25 is free from third harmonics, substantially all of the third harmonic voltage appearing at the wiper arm 35 of potentiometer 30 when the network is balanced may be attributed to the voltage coefficient characteristic of the test resistor 23.

The circuit of Fig. 2 corresponds to that of Fig. 1 in a manner now explained. Terminal 25 of Fig. 2 to which the pure sine wave is applied corresponds to terminal 6 of Fig. 1 at which potential $E_1$ is applied. Resistance 23 of Fig. 2 corresponds to resistor X of Fig. 1. Feedback amplifier B of Fig. 2 corresponds to feedback amplifier A of Fig. 1. Contact 35 of Fig. 2 corresponds at balance to terminal 9 of Fig. 1. Therefore, the resistance represented by resistor 1 in Fig. 1 corresponds to the parallel combination of resistors 28, 29 and the upper portion of potentiometer 30 of Fig. 2. The resistance represented by resistor 2 in Fig. 1 corresponds to the parallel combination of resistors 36, 37, the unshorted portion of rheostat 39 and the lower portion of potentiometer 30. Thus it will be evident from our previous consideration of Fig. 1, that if potential $E_1$ is applied at terminal 25, and if the arms of potentiometer 30 and rheostat 39 are positioned so that the portions of Fig. 2 corresponding to resistors 1 and 2 are equal in resistance, that a potential corresponding to that derived at terminal 9 will appear at contactor arm 35 of potentiometer 30.

In the circuit of Fig. 2 a plurality of feed-back resistors 24a—24d are shown with selective means, designated S–3, by which any one of the resistors 24a—24d may be connected between the output terminal 40 and the input terminal 41 of feed-back amplifier B. Because of the importance of eliminating capacitive coupling between the output 40 and the input 41, particularly when the circuit of Fig. 2 is to be employed for measuring phase shift in a test resistor, the selective connecting means S–3 should preferably be a clip type connector with very short connecting leads, rather than a rotary type selector switch.

For measurement of voltage coefficient the selected standard resistor 24, and the combined resistors 28 and 29 should be of such value as to effect a potential summing ratio of one to one through the amplifier grid circuit input resistor 44. In the comparing network of Fig. 2 the standard resistor 24 should preferably have a value approximately equal to the resistance value of the test sample resistor 23. If the sample resistor to be tested for voltage coefficient has a resistance value of 10,000 ohms, a 10,000 ohm standard resistor should be selected from the group resistors 24a—24d. Resistors 28, 29, 36, 37 and potentiometer 30 may each have a value of 10,000 ohms. Resistor 44 should preferably have a value of 39,000 ohms in this circuit, and the vernier rheostat 39 may have a value of 100 ohms resistance. The switch S–2 should be in the position shown in Fig. 2, connecting the wiper arm 35 of potentiometer 30, through shielded conductor 45, to the wave analyzer 43. In this position, with contact arm 32 disengaged from contact 31, resistors 28 and 29 are connected in the comparison network to achieve a 1:1 summing ratio.

The sequence of operations in testing resistors for voltage coefficient is as follows. Switch 12 is closed to apply A.C. power from source 10 to the circuit, through potentiometer 13. Switch 17 is closed to connect voltmeter 18 between the comparing input terminal 25 and ground. The wiper arm 14 of potentiometer 13 is adjusted until a desired value of voltage is indicated on A.C. voltmeter 18. For convenience in observing an output voltage on calibrated wave analyzer 43, I prefer to adjust the input voltage at point 25 to exactly 50 volts, although any other value of voltage may be applied to the comparing network, as may be desired. This done, the switches 12 and 17 are opened to disconnect the power source 10 and voltmeter 18 from the circuit. Switch S–2 is moved to the position shown in Fig. 2 of the drawing to connect wave analyzer 43 through shielded conductor 45 to the arm 35 of network potentiometer 30, and to open the shunt connection between 31 and 32 across resistors 28 and 29. The sample resistor 23 to be tested is connected to terminals 26 and 27. A standard resistor 24 is selected from the group of resistors 24a—24d having a value approximately equal to the resistance of the sample 23, and is connected to the terminal 41 by means of the clip connector S–3, and switch 12 is again closed to apply the previously selected potential of pure sine wave form to the comparing network. Assuming that voltage of the power source 10 is 60 cycle A.C., which is the frequency most commonly available in the United States, the wave analyzer 43 is now tuned to 180 c.p.s., the third harmonic of the 60 c.p.s. fundamental frequency. It is to be understood that if the fundamental frequency of the power source 10 is other than 60 cycles, the wave analyzer 43 should not be tuned to 180 c.p.s. but rather should be adjusted to the third harmonic of whatever fundamental frequency is supplied by source 10. Thus, if the power source 10 operates at 50 cycles, the wave analyzer 43 should be tuned to 150 c.p.s. As is well-known to those skilled in the art, a wave analyzer comprises selectable frequency selective networks and voltage magnitude measuring means so that the magnitude of harmonic potentials may be measured.

With wave analyzer 43 tuned to the third harmonic of the power source 10, the wiper arm 35 of potentiometer 30 is adjusted to give a minimum indication on wave analyzer 43. A final and more critical balance of the comparing network may be obtained by further adjustment of the vernier rheostat 39. With the comparing network thus balanced, the third harmonic voltage indicated on wave analyzer 43 is noted. The factor of voltage coefficient of the sample resistor 23 may now be determined from Equation 3 derived above.

$$k = \frac{8.3 E_9}{E^2} \quad \text{(R.M.S. voltages)} \qquad (10)$$

where $k$ is the voltage coefficient
$E_9$ is the third harmonic voltage indicated by the wave analyzer at the balance point.
$E$ is the voltage applied to the comparing network.

The factor $k$ may be expressed in percent or in parts per million. When used in the equation $R = R_o(1 \pm kE)$, the equation for the test sample under the applied voltage may be calculated. The quantity $kE$ then represents the change in resistance of the test sample due to the applied voltage $E$.

If, as suggested in the step-by-step test procedure above, the voltage applied to point 25 of the bridge circuit in Fig. 2 is initially adjusted to exactly equal 50 volts, Equation 3 above becomes:

$$k = \frac{8.3 E_9}{50^2} = 3.3^2 \quad E_9 \text{ parts per million}$$

or $$k = .000332 \ E_9\%$$

where $E_9$ is the third harmonic balance voltage in millivolts.

By means of a suitably calibrated scale for wave analyzer 43, the value of $k$ may be read directly, and no computations are required of the test operator. Those skilled in the art will recognize that the circuits shown in Figs. 1 and 2 actually comprise networks which are adjusted to a balance so that the potential at the measured terminal carries the third harmonic generated in the network by the voltage coefficient of the resistance being tested. Referring to Fig. 1, the network may be seen to comprise four legs, resistance 1, resistance 2, resistance X, and feedback amplifier A. As explained above, the input terminal 5 of amplifier A remains at a virtual ground potential. Opposite nodes on the network at terminal 3 and terminal 6 are impressed with potentials $E_i$ and $E_o$ in series, the junction point between the two potentials being at ground. Connected between the network node at terminal 9 and ground is the output measuring device.

*Phase shift measurements*

The manner in which the impedance tester of the invention may be employed to determine the phase shift characteristics of impedances under test will now be described with reference to Fig. 2 of the drawing. This factor of phase shift is determined by measuring the quadrature output voltage of summing amplifier B. For this test it is important that a minimum of phase shift should be introduced into the comparing network by the other resistors connected therein, and it is particularly important that any effects of phase shift which may occur in the selected standard resistor 24 be minimized.

As carbon type resistors generally produce less phase shift than resistors of the wire-wound types, I prefer to employ a carbon resistor for the standard 24 when making this test. As some phase shift occurs in even the best of available carbon type resistors, to further minimize the phase shift occurring in the upper path of the comparing network between terminal 27 and wiper arm 35, a large portion of the output of amplifier B is fed back from terminal 40 to the input terminal 41 by selecting resistor 24 to have a much lower value of resistance than the test impedance 23. As a ratio of 10 to 1 has been found to give satisfactory results, it is recommended that the resistance of the selected resistor 24 be one-tenth the resistance of the test sample 23 so as to further reduce the phase shift of the standard resistor by a factor of ten. This results in a correspondingly lower voltage appearing at the output terminal 40 of summing amplifier B than was present at this point when the circuit of Fig. 2 was employed to measure voltage coefficient as described above. This lower voltage at 40 is compensated for in the network by moving switch S-2 to the opposite position from that illustrated in Fig. 2, so that switch arm 32 engages contact 31 to shunt resistors 28 and 29 from the circuit. By this means, any phase shift which might occur in resistors 28 and 29 is also eliminated. Operation of switch S-2 also moves switch arm 33 into engagement with contact 34 to connect vacuum tube voltmeter indicating device 42 with the wiper arm 35 of potentiometer 30, through shielded conductor 45.

As described above, in reference to the test for voltage coefficient, the parallel connected resistors 36 and 37 are especially selected of a type having a minimum of inductive and capacitive reactance so as to minimize the effect of phase shift occurring in the lower parallel path of the comparing network. When potential is applied to terminal 25 of the comparing network by closure of switch 12, and the wiper arm 35 of potentiometer 30 is now adjusted to give a minimum potential indication on vacuum tube voltmeter 42, and vernier rheostat 39 is adjusted to exactly balance the network it may be reasonably assumed that the entire voltage measured by indicator 42 is directly due to the quadrature voltage resulting from phase shift occurring in the test resistor 23.

It will be recalled that the potential outputs from amplifiers A and B were equal to and opposite in polarity from their potential inputs. As is well-known to those skilled in the art, the phase reversal in such amplifiers is exactly 180°. Thus it will be apparent that if equal and exactly opposite potentials are applied through a series combination of resistances 23, 36 and 37, 39 and 30, somewhere along the series circuit a virtual ground potential will exist. If a small amount of phase shift is introduced into the series circuit, the point formerly at virtual ground will be the null or lowest voltage point, but will carry a quadrature voltage component. The measure of the quadrature voltage component is a measure of the phase shift introduced.

Because of the ten to one summing ratio employed in the comparing network, as explained above, the quadrature voltage detected at wiper arm 35 and indicated on vacuum tube voltmeter 42 represents only one eleventh of the total quadrature voltage produced by phase shift in test resistor 23. Employing the relationship that the tangent of a small angle is equal to the angle itself, the degree of phase shift occurring in the test sample in this circuit may be calculated from the general equation $$\theta = \frac{\left(1\frac{R_1}{R_2}\right)E_q}{E}$$

where $\theta$ is the angle of phase shift in milliradians;
$R_1$ is the resistance in ohms of the resistor under test;
$R_2$ is the resistance in ohms of the standard resistor;
$E_q$ is the quadrature voltage in millivolts;
$E$ is the voltage (in volts) applied to the test resistor.

If the resistance of the standard resistor 24 is selected to have one-tenth the value of the resistance of the test impedance 23, and if the voltage applied to the test resistor is adjusted to 50 volts, as indicated on voltmeter 18 when switch 17 is closed, Equation 4 becomes:

$$\theta = \frac{11 E_q}{50} = .22 E_q$$

where $\theta$ is the angle of phase shift in milliradians and $E_q$ is the balance voltage in millivolts, as indicated on vacuum tube voltmeter 42.

By suitable calibration of the indicator scale on vacuum tube voltmeter 42, the angle of phase shift may be read directly without requiring any mathematical calculation by the test operator.

It is to be understood that the vacuum tube voltmeter 42 may be eliminated entirely, if desired and the wave analyzer 43 may be employed to indicate the angle of phase shift as well as the factor of voltage coefficient. If this is done the analyzer 43 may be provided with separately calibrated scales for both test indications. However, to enable both tests to be completed with greater ease, speed and accuracy, I prefer to employ separate indicators 42 and 43 as shown in the preferred embodiment of Fig. 2. Any one of several commercially available vacuum tube voltmeters and wave analyzers may be employed as the indicators 42 and 43. Summing amplifiers as indicated generally at B and C in Fig. 2 are also well known in the art, and may be procured commercially. A feed-back amplifier well suited for this purpose is disclosed in my copending application, Serial Number 388,055, filed October 23, 1953.

It will thus be seen that the objects set forth above, among those made apparent from the preceding description, are efficiently attained and, since cetrain changes in carrying out the above process and in the constructions set forth which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Electrical impedance testing means comprising in combination, a source of sine-wave potentials, means connecting a first terminal of a test impedance to a primary terminal of said source of potentials, means connecting a second terminal of said test impedance to an input terminal of a negative feedback amplifier, said negative feedback amplifier providing a 180° phase reversal between said input terminal and an output terminal, means including a plurality of resistors and switch means to connect separate resistors between the output terminal and the input terminal of said amplifier to provide selected different amounts of negative feedback from the output terminal to the input terminal to maintain the net input potential of the amplifier at zero, means connecting the output terminal of said amplifier to a first terminal of a potentiometer, means connecting a second terminal of said potentiometer through fixed and adjustable resistor means to the primary terminal of said source of potentials, means including a wiper arm coupled to said potentiometer for locating the point of minimum potential across said potentiometer, and means connected to said wiper arm for measuring the quadrature potential to determine the phase shift caused by said test impedance.

2. Electrical impedance testing means comprising in combination, means for supplying potentials of sine-wave form substantially free from odd harmonic frequency components to a selected terminal, means connecting a first terminal of an impedance to be tested to said selected terminal, means connecting an input terminal of a negative feedback amplifier to a second terminal of said impedance, said negative feedback amplifier reversing the phase of input signals to provide signals at its output terminal 180° out of phase with the input signals, means including a plurality of resistors and switch means connectable to supply a selected portion of said signal appearing on the output terminal to said input terminal, means connecting the output terminal of said amplifier to a first terminal of a potentiometer, means connecting a second terminal of said potentiometer through adjustable resistor means to said selected terminal, means including a wiper arm coupled to said potentiometer for locating the point of minimum potential across said potentiometer, and means for measuring third harmonic potential components at said point of minimum potential to determine the voltage coefficient of said impedance to be tested.

3. Electrical impedance testing means comprising in combination, a source of sine-wave potential, means connecting a first terminal of an impedance to be tested to a selected terminal of said source of potential, means connecting a second terminal of said impedance to be tested to an input terminal of an amplifier, said amplifier providing an output signal at an output terminal 180° out of phase with the signal on said input terminal, resistor means connected between the output terminal and the input terminal of said amplifier to provide a path for said output signal from said output terminal to said input terminal to stabilize said amplifier, means connecting the output terminal of said amplifier to a first terminal of a potentiometer, means connecting a second terminal of said potentiometer through adjustable resistor means to said selected terminal of said source of sine-wave potential, means coupled to said potentiometer for locating the point of minimum potential across said potentiometer, and means for measuring the quadrature potential component and the third harmonic potential component at said point of minimum potential to determine the phase shift caused by said impedance to be tested and the voltage coefficient of said impedance to be tested.

References Cited in the file of this patent

UNITED STATES PATENTS

| | | |
|---|---|---|
| 2,143,094 | Swift | Jan. 10, 1939 |
| 2,623,929 | Moody et al. | Dec. 30, 1952 |
| 2,656,506 | Bollman | Oct. 20, 1953 |
| 2,719,262 | Bousman | Sept. 27, 1955 |